United States Patent
Gorin

[15] 3,671,401
[45] June 20, 1972

[54] METHOD OF CALCINING AND DESULFURIZING CARBONACEOUS CONTIGUOUS BED OF AGGLOMERATES WITH PARTICULATE HEAT CARRIERS

[72] Inventor: Everett Gorin, Pittsburgh, Pa.
[73] Assignee: Consolidated Coal Company, Pittsburgh, Pa.
[22] Filed: July 9, 1970
[21] Appl. No.: 53,370

[52] U.S. Cl.................................201/12, 201/17, 201/20, 201/34, 201/6, 201/36, 201/44, 23/209.9
[51] Int. Cl..............C10b 49/18, C10b 53/08, C10b 57/12
[58] Field of Search..................201/6, 10, 12, 17, 20, 21–24, 201/31, 32–34, 36–38, 43, 44; 23/209.9; 208/11

[56] References Cited

UNITED STATES PATENTS

| | | | |
|---|---|---|---|
| 3,444,048 | 5/1969 | Schemling et al.............. | 201/12 X |
| 2,950,230 | 8/1960 | Batchelor et al............... | 201/17 |
| 3,073,751 | 1/1963 | Gorin et al..................... | 201/23 |
| 3,483,116 | 12/1969 | Hoffert.......................... | 208/11 |
| 3,499,834 | 3/1970 | Goins............................. | 201/32 X |
| 3,117,064 | 1/1964 | Friedrich....................... | 201/12 |

Primary Examiner—Norman Yudkoff
Assistant Examiner—David Edwards
Attorney—D. Leigh Fowler, Jr. and Stanley J. Price, Jr.

[57] ABSTRACT

An improved process for calcination of agglomerates to produce coke suitable for use in ore reduction furnaces, wherein calcination is effected simultaneously in at least two different heat transfer zones, in one of which gas is the principal source of heat and in the other of which solids are the principal source of heat. A stream of hot finely divided solid heat carriers are showered downwardly through the interstices of said downwardly moving bed consisting essentially of a column of contiguous, preheated agglomerates in the calcining zone at a velocity which is greater than that of said downwardly moving bed, the temperature of said heat carrier being higher than that of said agglomerates.

7 Claims, 2 Drawing Figures

INVENTOR.
EVERETT GORIN

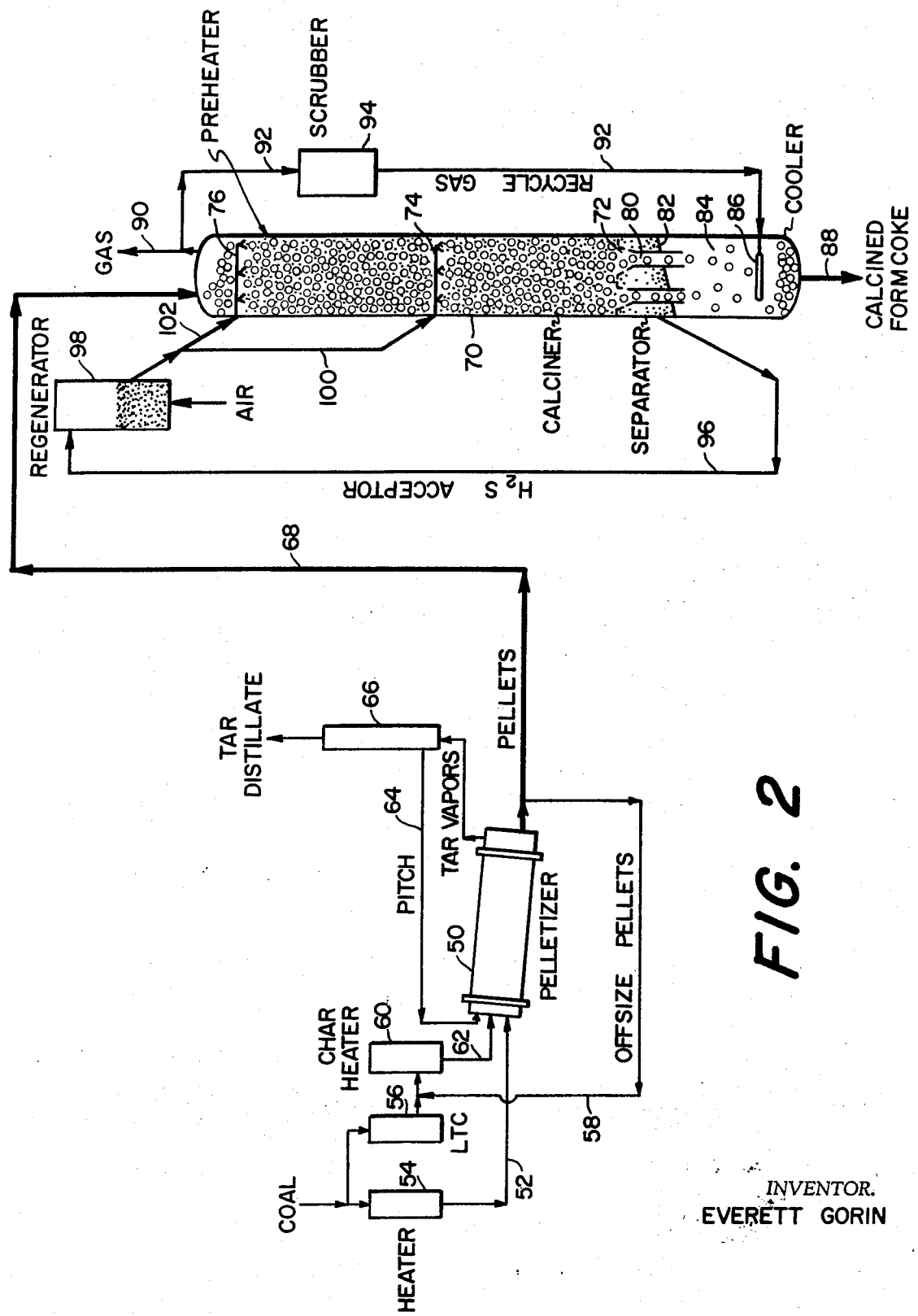

METHOD OF CALCINING AND DESULFURIZING CARBONACEOUS CONTIGUOUS BED OF AGGLOMERATES WITH PARTICULATE HEAT CARRIERS

BACKGROUND OF THE INVENTION

1. Field of the Invention

This invention relates to a process for producing coke suitable for use in cupolas, blast furnaces and other ore reduction furnaces, and more particularly, to an improved heat transfer system for calcination of carbonaceous agglomerates.

2. Description of the Prior Art

Many processes are known, and some are in commercial use, for making agglomerates from carbonaceous solids and binders of diverse kinds. Briquetting presses, rotary retorts, and other equipment have been employed in such processes to make agglomerates which, upon appropriate calcination, make coke suitable for use in metallurgical operations. The term "formcoke" is sometimes used to describe agglomerates in a calcined state and is so used herein.

The strength of formcoke must be adequate to sustain the "burden" of the ore reduction furnace. In the case of the blast furnace, the strength of the formcoke should be very high to minimize formation of fine particles which decrease furnace burden permeability. Calcination of the agglomerates plays a critical role in producing formcoke of the requisite strength. It also serves to regulate the volatile matter content of the formcoke. Still further, calcination may be a factor in the desulfurization of the agglomerates to produce a low sulfur formcoke. The particular process selected for achieving one or more of these objectives is also a function of the composition of the "green" (i.e. uncalcined) agglomerates. Some agglomerates require "shock heating" to prevent "grape clustering." Shock heating consists of sudden exposure of the agglomerates to a high temperature. Grape clustering is the adhesion of individual agglomerates to one another to form grape-like clusters. Other agglomerates require carefully controlled low heating rates, at least in certain temperature ranges, to achieve the desired strength of the formcoke.

Illustrative of the patents which describe processes for calcination of green agglomerates are the following: U. S. Pat. No. 2,871,004 U. S. Pat. No. 2,924,511 U. S. Pat. No. 3,018,226 U. S. Pat. No. 3,051,629 U. S. Pat. No. 3,117,064 U. S. Pat. No. 3,384,557 U. S. Pat. No. 3,444,048 U. S. Pat. No. 3,475,278 British Pat. No. 741,679. All the foregoing illustrative patents disclose various methods of transferring heat to the green agglomerates to effect calcination. However, like the prior art generally, they do not provide a heat transfer system which is readily adaptable to the heat requirements of the various and sundry agglomerates, while producing formcoke of the desired characteristics in a continuous commercially feasible process.

Accordingly, it is the primary object of this invention to provide an improved, continuous, commercially feasible process for calcining carbonaceous agglomerates. A secondary object is to provide a process wherein desulfurization is also effected.

SUMMARY OF THE INVENTION

The present invention is a continuous process for transferring heat to green carbonaceous agglomerates in a novel and commercially feasible system to effect calcination.

According to the broadest aspects of the invention, the green agglomerates are conducted through two different heat transfer zones, in the first of which gas is the principal source of heat and in the second of which solids are the principal source of heat. The first heat transfer zone is essentially a preheating zone. In this preheating zone, the heat is largely supplied by the hot effluent gas from the second heat transfer zone. The second heat transfer zone is the calcination zone proper. In this second zone, the preheated agglomerates from the first zone are calcined at a temperature above 1,400° F. The heat is supplied in the second zone by a stream of hot heat carrier solids.

More specifically, the transfer of heat to the agglomerates in the second zone, that is, the calcination zone proper, is accomplished in accordance with my invention as follows. A downwardly moving bed of the preheated agglomerates from the preheating zone is established and maintained. Then a stream of the hot heat carrier solids is showered down over the agglomerates and through the interstices of the downwardly moving bed at a velocity which is greater than that of the bed itself. At the same time, a stream of non-oxidizing gas is circulated upwardly through the bed in countercurrent flow relationship to the bed and to the hot heat carrier solids. The latter supply the heat required to calcine the agglomerates either by direct transfer to the agglomerates or by transfer to the gas and thence to the agglomerates. The stream of upflowing gas aids in maintaining uniformity of heat transfer throughout the bed of agglomerates by reason of its dispersal of the downwardly showering heat carrier. In the process, its own temperature is raised to the point where it can serve as the preheating gas used in the first heat transfer zone.

The agglomerates are maintained in the calcination zone long enough to produce the desired calcination. Then the heat carrier solids are separated and recycled after appropriate regeneration which simply consists of reheating if the heat carrier is an inert solid such as sand. However, the heat carrier may be an $H_2S$ acceptor such as manganese oxide. By use of such an acceptor as a heat carrier, desulfurization may be concurrently effected in the case of agglomerates derived from a sulfur-containing coal. In the calcination of such hydrocarbonaceous solids, some hydrogen is evolved which reacts with the sulfur to form $H_2S$. The acceptor reacts with the $H_2S$ to form the sulfide. The latter may be regenerated in any suitable manner, as well as reheated, before recycle to the calcination zone. Accordingly, as used herein, the term "regeneration" means reheating and restoring the heat carrier to its effective state for reuse in the calcination zone.

In accordance with the preferred embodiment of the invention, the process is applied to hydrocarbonaceous agglomerates which require a controlled heating rate from about 1,100° to about 1,450° F. to produce formcoke of the requisite strength. In the preferred embodiment, the hot effluent gas from the calcination zone is passed upwardly and countercurrently through a downwardly moving bed of the agglomerates in the preheating zone. The relative temperatures of solids and gas in the preheating zone, as well as their respective velocities, are regulated to maintain a heating rate which does not exceed 10° F. per minute over the range of about 1,100° to about 1,450° F. By "about," I mean ±50° F.

BRIEF DESCRIPTION OF THE DRAWINGS

For a better understanding of my invention, its objects and advantages, reference should be had to the accompanying drawings in which FIG. 2 is an illustration, partly schematic and partly in cross section, of the preferred embodiment of the process of my invention.

DESCRIPTION OF FIG. 1

Figure 1:
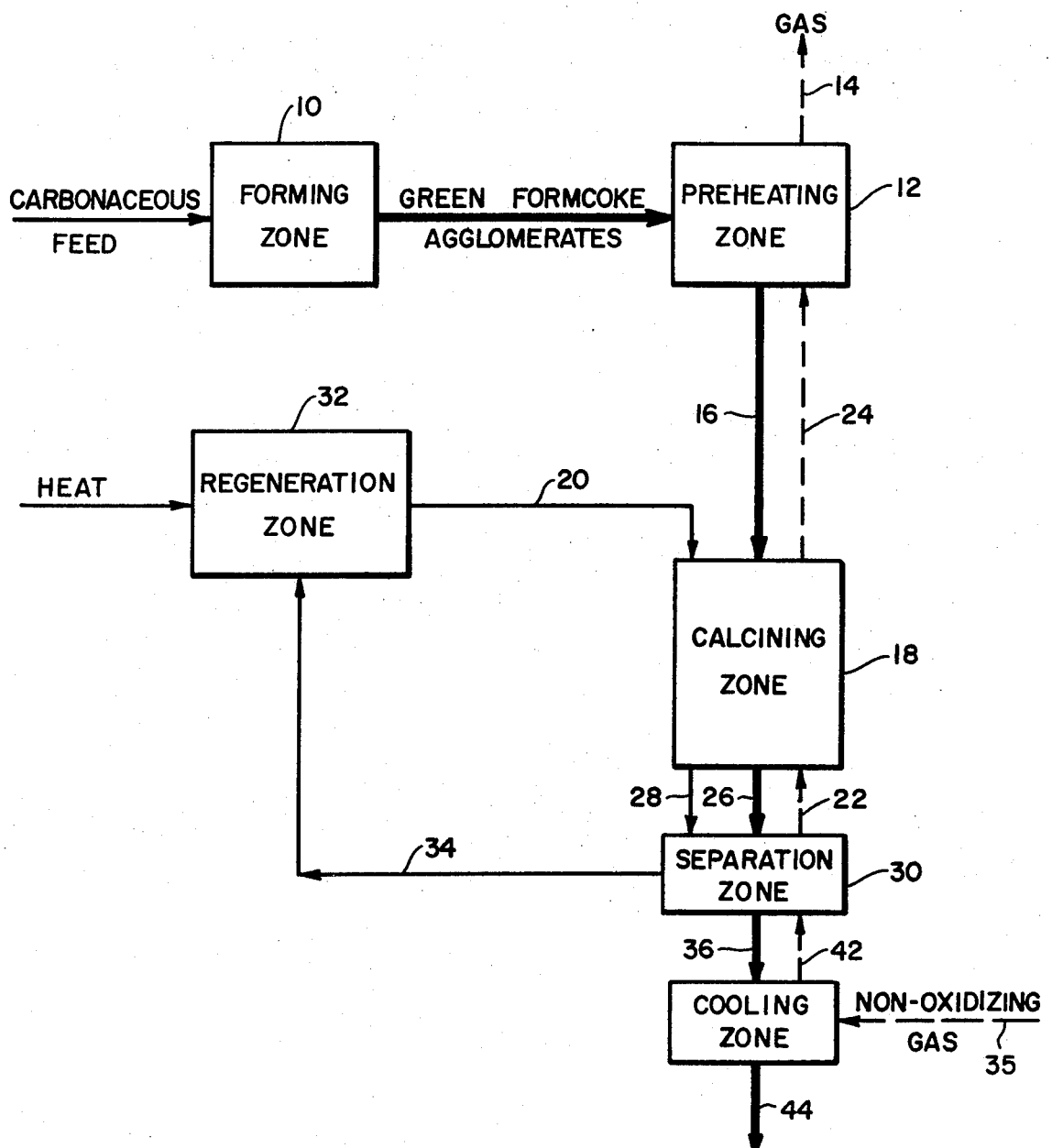
FIG. 1 is a schematic illustration of the process of my invention in its broadest aspects.

Referring to FIG. 1 of the drawings, numeral 10 designates a Forming Zone in which a carbonaceous feed is formed into green agglomerates by any of the well-known methods for doing so. The carbonaceous feed may be either coal- or petroleum-derived. The temperature in the Forming Zone is generally below 1,100° F. The green agglomerates are conducted to the first heat transfer zone, designated as Preheating Zone and by the numeral 12. In this zone 12, the green agglomerates are heated by a hot non-oxidizing gas circulated in direct heat exchange relation with the agglomerates. The heat-depleted gas is discharged through a line 14.

The preheated agglomerates are conducted through a conduit 16 to the second heat transfer zone, the Calcining Zone designated by the numeral 18, wherein the agglomerates are heated to a temperature in the range of about 1,600° to about 1800° F. at elevated pressures up to 200 psig and even higher. A bed of the agglomerates is established in the Calcining Zone which moves downwardly by gravity through the zone. A stream of hot solids, introduced into the calcining zone by a conduit 20, is showered down over the agglomerates and through the interstices of the moving bed of agglomerates at a velocity which is greater than that of the bed. At the same time, a non-oxidizing gas is introduced into the bottom of the Calcining Zone through a conduit 22 and is circulated upwardly through the Calcining Zone to assist in the uniform dispersal of the showering heat carrier and in the transfer of heat to the agglomerates, while at the same time being heated itself to a temperature sufficiently high to permit its use via conduit 24 as the heat carrier in the Preheating Zone 12.

The calcined agglomerates admixed with the heat carrier solids are removed from the Calcining Zone 18 to a Separation Zone 30. Conduits 26 and 28 are really one conduit, but are shown separately for the removal of the calcined agglomerates and heat carrier to schematically illustrate the flow of the two different solid streams. The latter are separated in the Separation Zone. The heat carrier is conducted to a Regeneration Zone 32 through a conduit 34 to be reheated and reactivated, as the case may be. The regenerated solids, at the requisite temperature, are recycled to the Calcining Zone via conduit 20.

The separated calcined agglomerates are conducted by a conduit 36 to a Cooling Zone 40 where they are cooled by direct heat exchange with the non-oxidizing gas which is introduced into the Cooling Zone by conduit 38 and discharged therefrom through conduit 42 to the Separation Zone and thence to the Calcining Zone through conduit 22. The cooled produce Calcined Formcoke is discharged through conduit 44. In some instances, it may be more convenient to separate the calcined agglomerates and the heat carrier after cooling rather than as shown in FIG. 1. In either case, however, the temperature of the product Formcoke is sufficiently reduced by the gas to eliminate any need for water quenching which is such an undesirable feature of present coke oven practice.

In FIG. 2 of the drawings, there is shown the preferred embodiment of the present invention, including the preferred method of forming the green agglomerates. The latter method is described in detail in U. S. Pat. No. 3,073,751 and will be described only briefly here. Coal, char (i.e. distillation residue of coal) and pitch in suitable proportions are fed to a substantially horizontal rotary kiln 50. The coal is fed to the kiln through a conduit 52 after being preheated by a Heater 54. Some coal is also fed to a low temperature carbonization unit (LTC) designated by the numeral 56 where it is distilled to yield char. This char, together with recycled char from a conduit 58, is preheated in a Char Heater 60 from which it is fed through a conduit 62 to the kiln 50. Pitch is introduced into the kiln via a conduit 64 which is connected to a fractionating column 66 that receives tar vapors from the kiln. The temperatures of the feed materials to the kiln are adjusted to maintain the desired forming temperature which is between about 725° and 825° F. Green agglomerates, sometimes called pellets, are formed in the kiln 50, sometimes called "Pelletizer," and leave the kiln at a temperature in the indicated range. Off-size pellets are separated, crushed, (not shown) and recycled through conduit 58. The remainder of the pellets, most of which are in the size range one-half inch to 3 inches, are conducted without deliberate cooling through a conduit 68 to the top of a retort 70.

The retort 70 is stationary, vertical, generally cylindrical vessel adapted to confine a calcining zone at high temperatures and elevated pressures. The green pellets are introduced into the top of the retort and, as they flow downwardly through the retort, form a column (or downwardly moving bed) of the contiguous pellets from the top to a point near the bottom of the retort where a grid Separator 72 is arranged transversely across the retort.

The upper portion of the retort 70 serves as the preheating zone of the incoming pellets. That portion is labeled "Preheater." It extends from the top of the retort to the point where the major part of the solid heat carrier is introduced into the retort through a distributor 74. The lower part of the retort houses the calcination zone which extends downwardly to the Separator and is labeled "Calciner."

The major source of heat for the Preheater is the hot effluent gas from the Calciner. However, when the solid heat carrier to the Calciner is an $H_2S$ acceptor, as it is in this preferred embodiment, then a small amount of the hot acceptor may be introduced into the top of the Preheater through a distributor 76, primarily to remove the last vestiges of $H_2S$ that may still be present in the effluent gas, but at the same time supplying a modest amount of supplemental heat. It is essential to maintain a pellet heating rate in the preheater which is below 10° F. per minute, at least in that zone of the preheater where the pellets are at a temperature between about 1,100° and about 1,450° F. The desired heating rate is achieved by appropriate adjustment of the relative velocities of the downwardly moving bed of pellets and the upwardly flowing gas, as well as the amount of acceptor which is introduced by the distributor 76.

As the downwardly moving bed of preheated pellets, now at about 1,450° F., enters the Calciner, it is met by a shower of the hot acceptor solids introduced through the distributor 74. Other distributors may be provided at lower points for injecting supplemental hot solids. The solids, inert or acceptor, used in the process of this invention, are generally finely divided with a top size usually below eight mesh (Standard Tyler screen) in order to obtain high heat transfer rates between the heat carrier and the gas. The minimum size is determined by the density of the solids and the gas upflow velocity in the Calciner and must be such that it is not transported upwardly to any great extent above the heat carrier solids feed point. Generally, the minimum size is above 400 mesh but this will vary with the detailed geometrical design and the operating pressure in the Calciner.

The gas has a dual function. It aids in the uniform dispersal of the acceptor solids throughout the bed of pellets, and it acts as a heat transfer medium for transfer of heat from acceptor to the pellets. The height of the Calciner is such that, by the time the pellets reach the Separator, they have been heated to a temperature within the range 1,600° to 1,800° F.

The calcined pellets are separated from the smaller size acceptor solids by the grid Separator 72. The acceptor solids pass through the grid openings while the pellets fall through standlegs 80. A plate 82, preferably inclined, through which the pipes extend, serves to limit passage of upflowing gas to the standlegs 80. The velocity of gas is high enough to prevent the fine solids from flowing down the standleg; i.e. it is above the terminal velocity of the coarsest particles. The space below plate 82 defines a cooling zone 84, also labeled "Cooler." A relatively cool non-oxidizing gas is introduced into this cooling zone by means of a distributor 86. This gas passes countercurrently to the pellets descending through the zone. There is a transfer of heat from the hot pellets to the ascending gas. The cooled pellets are withdrawn from the retort 70 through a conduit 88 as Calcined Formcoke, the desired product.

The non-oxidizing gas introduced into the Cooler serves many purposes. After leaving the Cooler, it assists in the separation of the acceptor solids from the pellets as above described. When it passes through the grid Separator 72, it is dispersed uniformly throughout the downwardly moving streams of solids. Its velocity is carefully regulated so as to somewhat hinder the flow of acceptor solids as they shower downwardly through the interstices, but not enough to reduce the downward velocity of the acceptor to that of the pellets. There is a devolatilization of the pellets as their temperature rises. The evolved vapors include tar vapors, hydrogen, methane and $H_2S$. The $H_2S$ is largely absorbed by the acceptor, converting it to its sulfide form. The vapors ascend with the non-oxidizing gas which is heated to a temperature approaching that of the acceptor solids by the time the effluent gas and vapors reach the distributor 74. The resulting hot gas, as previously stated, serves as the principal heat source in the Preheater. Any residual $H_2S$ is picked up by the acceptor solids introduced through the distributor 76. The now partially cooled gas and effluent vapors are discharged from the top of the retort 70 through a conduit 90. A side stream is recycled through a conduit 92 for reuse as non-oxidizing gas after appropriate clean-up in a Scrubber 94.

The separated acceptor solids leave the retort 70 through a conduit 96 and are conveyed to a Regenerator 98. The acceptor solids are metal oxides which, upon reaction with $H_2S$, form the corresponding sulfides. Their use as $H_2S$ acceptors, as well as their regeneration, is fully described in U. S. Pat. No. 2,824,047. The regeneration is generally effected by passing air through a fluidized bed of the acceptor. There is always some carry-over of carbonaceous solids with the acceptor solids. The air burns the carbon to heat up the bed, and the oxygen also reacts with the sulfide to convert it to the oxide. The temperature of the bed of acceptor may be regulated to fall within the desired range of 1,700° to 1950° F. The regenerated acceptor is then transported by conduits 100 and 102 to the retort 70 to serve as previously described.

EXAMPLES

The following Table presents a summary of conditions and results obtained in two runs made at low pressure (25 psia) employing sand and manganese oxide (Mno), respectively, as heat carriers. The green agglomerates consisted of pellets made in a rotary kiln from a highly caking Pittsburgh Seam bituminous coal, as described in connection with FIG. 2, from a mixture of coal and char in the relative proportions of 47 weight percent coal and 53 weight percent char. The size range of the green agglomerates was three-fourth inch to 2 inches diameter. The size range of the heat carrier (sand or oxide) was 28 to 100 mesh (Tyler Standard).

The high nitrogen content of the make gas arises from the use of nitrogen purge gas in the particular equipment used. It does not, therefore represent the true composition of the make gas which ordinarily will contain only about 1.5 volume percent nitrogen.

The high heat carrier/coke ratio used does not represent commercial operation where it would be much lower, usually about one. The high ratio in this instance was necessitated in order to make up for large heat losses incidental to the relatively small scale equipment employed.

TABLE

| Conditions | Run A (sand) | Run B (MnO) |
|---|---|---|
| Inlet temperature, heat carrier, °F | 1,720 | 1,750 |
| Ratio of heat carrier/green coke | 3.8 | 5.4 |
| Temp. profile in retort: | | |
| Preheater (range, °F.) | 740–1,475 | 750–1,445 |
| Calciner (range, °F.) | 1,475–1,662 | 1,445–1,665 |
| Cooler (range, °F.) | 1,507–475 | 1,510–376 |
| Max. heating rate in critical heating zone, °F./min | 5.7 | |
| Calcined formcoke withdrawal rate, lb./hr | 51 | 48 |
| Heat carrier withdrawal rate, lb./hr | 234 | 298 |
| Non-oxidizing feed gas flow rate, s.c.f.h | 470 | 700 |
| Non-oxidizing feed gas velocity, ft./sec. | 1.2 | 1.8 |
| Composition of exit gas, Vol. percent: | | |
| $N_2$ | 19.75 | 26.53 |
| $H_2$ | 55.66 | 52.39 |
| $CH_4$ | 16.07 | 12.20 |
| $CO$ | 7.40 | 8.90 |
| $CO_2$ | 0.45 | 0.54 |
| $H_2S$ | 0.50 | 0.34 |
| $O_2$ | 0.08 | 0.07 |
| Calcined coke evaluation: | | |
| ASTM stability | 60.5 | 46.0 |
| ASTM hradness | 70.4 | 58.9 |
| Average percent S rejected | 31.3 | 51.7 |

According to the provisions of the patent statutes, I have explained the principle, preferred construction and mode of operation of my invention an have illustrated and described what I now consider to represent its best embodiment. However, I desire to have it understood that, within the scope of the appended claims, the invention may be practiced otherwise than as specifically illustrated.

I claim:

1. The method of converting carbonaceous agglomerates to formcoke suitable for use in an ore reduction furnace which comprises:
   a. passing said carbonaceous agglomerates through a preheating zone in direct heat exchange relation with a non-oxidizing gas which is at a higher temperature than the agglomerates,
   b. establishing and maintaining a downwardly moving bed consisting essentially of a column of contiguous preheated agglomerates in a calcining zone,
   c. showering a stream of hot finely divided solid heat carrier downwardly through the interstices of said downwardly moving bed of agglomerates in said calcining zone at a velocity which is greater than that of said downwardly moving bed, the temperature of said heat carrier being higher than that of said agglomerates,
   d. passing a non-oxidizing gas upwardly through said calcining zone in countercurrent flow relationship with both downwardly moving streams of solids,
   e. regulating the transfer of heat from said heat carrier to said agglomerates to raise the temperature of said agglomerates above 1,400° F. while they are maintained in said calcining zone until the desired calcination is effected,
   f. conducting the effluent gas from the calcining zone to the preheating zone to serve as the non-oxidizing gas in step (a),
   g. separating the solid heat carrier from the calcined agglomerates, and
   h. recovering the calcined agglomerates.

2. The method of converting carbonaceous agglomerates to formcoke suitable for use in an ore reduction furnace which comprises:
   a. passing said carbonaceous agglomerates through a preheating zone in direct heat exchange relation with a non-oxidizing gas which is at a higher temperature than the agglomerates,
   b. regulating the rate of heat transfer from the non-oxidizing gas to said agglomerates in said preheating zone so that the temperature of said agglomerates is raised at a rate less than 10° F. per minute over the temperature range of about 1,100° to about 1,450° F.,
   c. establishing and maintaining a downwardly moving bed consisting essentially of a column of contiguous preheated agglomerates from step (b) in a calcining zone,
   d. showering a stream of hot finely divided solid heat carrier downwardly through the interstices of said downwardly moving bed of agglomerates in said calcining zone at a velocity which is greater than that of said downwardly moving bed, the temperature of said heat carrier being higher than that of said agglomerates,
   e. passing a non-oxidizing gas upwardly through said calcining zone in countercurrent flow relationship with both downwardly moving streams of solids,
   f. regulating the transfer of heat from said heat carrier to said agglomerates to raise the temperature of said agglomerates above 1,400° F. while they are maintained in said calcining zone until the desired calcination is effected,
   g. conducting the effluent gas from the calcining zone to the preheating zone to serve as the non-oxidizing gas in step (a),
   h. separating the solid heat carrier from the calcined agglomerates, and regenerating the carrier for reuse in the calcining zone, and
   i. recovering the calcined agglomerates.

3. The method according to claim 2 in which the carbonaceous agglomerates are derived from sulfur-containing coal.

4. The method according to claim 3 in which the solid heat carrier is an H₂S acceptor.

5. The method according to claim 4 in which a minor portion of the H₂S acceptor is introduced into the preheating zone.

6. In the process of making calcined formcoke pellets from a sulfur-containing coal which includes the formation of the green pellets in a rotary tumbling kiln followed by calcination of the green pellets to produce formcoke suitable for use in an ore reduction furnace, the improvement in the calcination step of said process which comprises:
   a. establishing and maintaining a downwardly moving bed consisting essentially of a column of contiguous pellets,
   b. introducing hot finely divided H₂S acceptor solids into said downwardly moving bed of pellets, a minor proportion of said acceptor solids being introduced into the top of said bed while the rest is introduced therebelow,
   c. showering said hot acceptor solids downwardly through the interstices of said downwardly moving bed of pellets at a velocity which is greater than that of said downwardly moving bed,
   d. passing a non-oxidizing gas upwardly through the downwardly moving streams of solids in countercurrent flow relationship thereto,
   e. regulating the temperature of the acceptor solids introduced into the downwardly moving bed of pellets and the relative velocities and amounts of the gas stream and the two streams of solids to preheat the pellets in the top portion of the downwardly moving bed to about 1,450° F. at a heating rate less than 10° F. per minute over the range of about 1,100° to about 1,450° F., and to maintain the temperature of the pellets above 1,400° F. in the lower portion of the bed until the desired calcination is effected,
   f. separating the acceptor solids from the calcined pellets, and regenerating the acceptor solids for recycle to the downwardly moving bed, and
   g. recovering the calcined pellets as formcoke suitable for use in ore reduction furnaces.

7. In the process of heat-treating heat-sensitive carbonaceous agglomerates, the improvement which comprises:
   a. establishing and maintaining a downwardly moving bed consisting essentially of a column of contiguous heat-sensitive carbonaceous agglomerates in a vertical retort,
   b. introducing a stream of hot heat carrier solids of finer size consist than the heat-sensitive solids into the downwardly moving bed of said heat-sensitive solids at a point intermediate the top and bottom of the column of downwardly moving heat-sensitive solids,
   c. showering said heat-carrier solids downwardly over the heat-sensitive solids and through the interstices thereof at a higher velocity than that of said heat-sensitive solids,
   d. separating said heat-carrier solids from said heat-sensitive solids at the foot of said column of downwardly moving bed of solids,
   e. passing gas in heat exchange relation with the now hot separated heat-sensitive solids to effect cooling of said solids in a cooling zone,
   f. circulating the effluent gas from said cooling zone upwardly in countercurrent flow relationship to both downwardly moving streams of solids to assist in the transfer of heat from the heat-carrier solids to the heat-sensitive solids in a heating zone while at the same time being itself further elevated in temperature, and
   g. continuing the circulation of the gas beyond said point of introduction of heat-carrier solids upward through and in countercurrent flow relationship to the downwardly moving bed of heat-sensitive solids to effect preheating thereof in a preheating zone.

* * * * *

UNITED STATES PATENT OFFICE

CERTIFICATE OF CORRECTION

Patent No. 3,671,401　　　　　Dated　June 20, 1972

Inventor(s)　Everett Gorin

It is certified that error appears in the above-identified patent and that said Letters Patent are hereby corrected as shown below:

On the Abstract page at [73]: Change the name of the Assignee from "Consolidated Coal Company" to --Consolidation Coal Company--;

Col. 3, line 35:　　"produce" should read --product--;

Col. 5 at the Table: Under the heading "Run B(MnO)" insert the figure --4.7-- across from the line reading "Max. heating rate in critical heating zone, °F./min."

Signed and sealed this 24th day of April 1973.

(SEAL)
Attest:

EDWARD M. FLETCHER, JR.　　　　ROBERT GOTTSCHALK
Attesting Officer　　　　　　　　Commissioner of Patents